(12) United States Patent
Hwang

(10) Patent No.: US 10,399,625 B2
(45) Date of Patent: Sep. 3, 2019

(54) TILT ANGLE ADJUSTING APPARATUS FOR BICYCLE SADDLE

(71) Applicant: Soung Man Hwang, Suwon-si (KR)

(72) Inventor: Soung Man Hwang, Suwon-si (KR)

( * ) Notice: Subject to any disclaimer, the term of this patent is extended or adjusted under 35 U.S.C. 154(b) by 31 days.

(21) Appl. No.: 15/741,321

(22) PCT Filed: Apr. 11, 2016

(86) PCT No.: PCT/KR2016/003757
§ 371 (c)(1),
(2) Date: Jan. 2, 2018

(87) PCT Pub. No.: WO2017/014408
PCT Pub. Date: Jan. 26, 2017

(65) Prior Publication Data
US 2019/0002049 A1     Jan. 3, 2019

(30) Foreign Application Priority Data

Jul. 21, 2015   (KR) .................. 10-2015-0102753
Oct. 30, 2015   (KR) .................. 10-2015-0152172
Feb. 2, 2016    (KR) .................. 10-2016-0012838

(51) Int. Cl.
*B62J 1/08*      (2006.01)
*B62K 19/36*     (2006.01)
(Continued)

(52) U.S. Cl.
CPC ............. *B62J 1/08* (2013.01); *A47C 7/14* (2013.01); *B62J 1/28* (2013.01); *B62K 19/36* (2013.01)

(58) Field of Classification Search
CPC ........................... B62J 1/08; B62J 1/04
See application file for complete search history.

(56) References Cited

U.S. PATENT DOCUMENTS 3,302,970 A   2/1967   Rizzato
5,441,327 A   8/1995   Sanderson
(Continued)

FOREIGN PATENT DOCUMENTS

EP   0 542 650 A1   5/1993
GB      16792 A     7/1896
(Continued)

OTHER PUBLICATIONS

International Search Report for PCT/KR2016/003757 dated Jul. 28, 2016 from Korean Intellectual Property Office.
(Continued)

*Primary Examiner* — David R Dunn
*Assistant Examiner* — Tania Abraham
(74) *Attorney, Agent, or Firm* — Paratus Law Group, PLLC

(57) ABSTRACT

A bicycle having a saddle installed in a saddle support. The bicycle includes: a tilt adjusting part which can adjust the tilt angle of the saddle with respect to the saddle support by raising or lower the rear part of the saddle in a state in which the bicycle is driven or stopped. The tilt adjusting part includes: a latch which connects the saddle support to a saddle coupling part and has multiple latch grooves at uniform intervals; and a stopper which is formed in the saddle support to control the rotation and fixation of the latch.

7 Claims, 9 Drawing Sheets

(51) Int. Cl.
    *B62J 1/28*    (2006.01)
    *A47C 7/14*    (2006.01)

(56)        References Cited

U.S. PATENT DOCUMENTS 8,485,597 B2 *    7/2013    Kim .......................... B62J 1/08
                                                      297/195.1
    2010/0194156 A1    8/2010    Kim
    2016/0059919 A1 *    3/2016    Kim .......................... B62J 1/08
                                                      248/286.1

FOREIGN PATENT DOCUMENTS

GB            180770 A      6/1922
    JP        2004-330815 A    11/2004
    KR    10-2009-0038688 A     4/2009
    KR    10-2010-0083023 A     7/2010
    KR          10-1351686 B1    1/2014
    KR    10-2015-0141111 A    12/2015
    WO        WO 94/18054 A1    8/1994
    WO     WO 2011/102562 A1    8/2011

OTHER PUBLICATIONS

Extended European Search Report for related EP application No. 16827912.3 dated Jan. 25, 2019 from European Patent Office.

* cited by examiner

TILT ANGLE ADJUSTING APPARATUS FOR BICYCLE SADDLE

CROSS REFERENCE TO PRIOR APPLICATIONS

This application is a National Stage Patent Application of PCT International Patent Application No. PCT/KR2016/003757 (filed on Apr. 11, 2016) under 35 U.S.C. § 371, which claims priority to Korean Patent Application Nos. 10-2015-0102753 (filed on Jul. 21, 2015), 10-2015-0152172 (filed on Oct. 30, 2015), and 10-2016-0012838 (filed on Feb. 2, 2016), which are all hereby incorporated by reference in their entirety.

BACKGROUND

The present invention relates to a bicycle saddle installed on a bicycle saddle support and on which a rider sits and which supports a load of the rider and a technology of adjusting a height of a front or a rear of a saddle by adjusting a tilt angle between a saddle support and the saddle according to a physical condition of a rider or riding conditions while the rider is riding a bicycle or stops to ride a bicycle.

Light has been newly shed on bicycles, which utilize human energy and are a pollution-free transportation means, as exercise equipment for the general public. Accordingly, amenities for bicycle riding are increasing such that use of bicycles is continuously increasing. For example, bike lanes are being installed in many places. Accordingly, accidents such as riders falling off of bicycles during riding have also increased.

All bicycles used up to now include saddles to allow a rider to sit on and transfer a pedal effort generated by pushing down on pedals to wheels to drive a bicycle. As shown in FIG. 1, a saddle A is installed above a saddle support 1 so that a saddle surface on which a rider sits is horizontal to the ground.

Also, in Korean Patent Application No. 10-2014-0105204 filed by the present applicant, a bicycle saddle is installed by installing, at a top end of a saddle support 1 as shown in FIG. 2A, a saddle A with a back in the rear thereof, and by coupling a saddle coupling portion 3, which has a horizontal portion, to the saddle support 1 and fixing them using a fastening bolt B as shown in FIG. 2B such that a saddle surface on which a rider sits is horizontal to the ground.

Accordingly, operations for adjusting a tilt angle of the saddle as necessary according to riding conditions and the like while the bicycle is generally in a horizontal state are complicated and difficult since it is necessary to unfasten the fastening bolt B which fixes the saddle A to the saddle support 1, adjust the tilt angle, and then tighten the fastening bolt B again. Accordingly, after an angle of the saddle is adjusted, it is general to continue to use the bicycle as it is unless there is a particular change in bicycle riding conditions.

However, since a variety of changes in conditions such as the road, riding condition, physical condition, riding fatigue, and the like occur while riding a bicycle, it is necessary to adjust a tilt angle of an overall saddle surface on which a rider sits by adjusting a height of a front or a rear of the saddle.

That is, since a front wheel portion of a bicycle rises and a rear wheel portion thereof is lowered when a rider goes up a hill on the bicycle, a front portion of a saddle also becomes higher and a rear portion thereof which supports the rider's hips becomes lower such that the body of the rider is inclined backward and the rider pushes pedals in an inclined state. Accordingly, it is difficult to apply an adequate pedal effort. Also, when the rider goes down a hill, since the front wheel portion of the bicycle is lowered and the rear wheel portion thereof rises, the front portion of the saddle also becomes lower and the rear portion which supports the rider's hips becomes higher such that the body of the rider is inclined forward. Accordingly, when a bicycle stops suddenly, accidents frequently occur in which bodies of high-speed riders and, in particular, inexperienced riders or the old and infirm are not supported by the saddle, slide toward the handlebars, and fall off the bicycle.

Also, since people with short arms can hold handlebars using their hands only when they bend their bodies by increasing an angle at which their backs are bent with respect to their hips while sitting on a saddle, backache, pain caused by a saddle, and the like occur during long periods of riding.

SUMMARY

It is an objective of the present invention to provide an apparatus for adjusting a tilt angle of a saddle in which the tilt angle of the saddle is freely adjusted during riding a bicycle or stop of riding a bicycle in order to increase a pedal effort of a pedal while a rider sits on the saddle according to bicycle riding conditions, to reduce pain generated during riding, and to stably maintain a riding posture of the rider on a downhill road to maintain optimal riding conditions.

According to one aspect of the present invention, an apparatus for adjusting a tilt angle of a bicycle saddle in a bicycle in which a saddle (A) is installed on a saddle support (1) includes a tilt adjustor (2) capable of adjusting a tilt angle of the saddle with respect to the saddle support by raising or lowering a rear portion or a front portion of the saddle during riding of the bicycle or in a state in which riding is stopped. Here, the tilt adjustor (2) includes a latch (4) which connects the saddle support (1) with a saddle coupling portion (3) and a stopper (6) which stops and fixes rotation of the latch (4) at the saddle support.

The latch (4) may comprise a latch plate (4a) with a predetermined width, a length, and a predetermined thickness and having a horizontal plate portion and vertical plate portions connected to the horizontal plate portion and a plurality of latch grooves (4b) formed at predetermined intervals on free ends of the vertical plate portions of the latch plate. The latch grooves (4b) may be formed of a plurality of grooves and teeth. The plurality of grooves and teeth in the rear side of the latch plate may have rounded inner and outer corners. The plurality of grooves in the front side of the latch plate respectively may have a rounded corner on one side in the inside of a groove and an angulated corner on the other side in the inside of the groove, ends of the teeth connected to the rounded corners inside the grooves may be angularly formed, and ends of the teeth connected to the angulated corners inside the grooves may be formed to be round.

The latch (4) may include a latch plate (4a) with a predetermined width, a length, and a predetermined thickness and having a 'Π' shape in which a plurality of latch grooves (4b) are formed at predetermined intervals on both ends of a vertical plate portion of the latch plate, in which a coupling bar (3a) coupled to the saddle coupling portion (3) is weld-coupled to a horizontal plate portion of the latch plate, and in which a hinge bolt (5) is inserted into a top portion of the latch plate and fixed to the saddle support (1). The latch (4) may include a latch plate (4a) having a predetermined width, a length, and a predetermined thickness and having a 'Π' shape, wherein a plurality of latch grooves (4b) are formed at predetermined intervals on both ends of a vertical plate portion of the latch plate, wherein a coupling plate (3b) coupled to the saddle coupling portion (3) is weld-coupled to a horizontal plate portion of the latch plate (4a), wherein a hinge bolt coupling hole (5a) where the hinge bolt (5) is inserted into and coupled to is formed at the vertical plate portion and the coupling plate of the latch plate (4a), wherein mounting grooves (3c) in which left and right frames of the saddle coupling portion (3) are mounted are formed at both ends of the coupling plate, wherein a torsion spring mounting hole (3f) where an end of a first lug of a torsion spring is inserted into and coupled to is formed at one side of the coupling plate, and wherein a bolt hole for inserting a coupling bolt (3e) coupled with a coupling panel (3d) of the saddle coupling portion (3) is formed at central portions of the horizontal plate portions of the latch plate and the coupling plate. The latch (4) includes a latch plate (4a) and a coupling plate (3b) which have predetermined widths, lengths, and predetermined thicknesses. A plurality of latch grooves (4b) are formed at predetermined intervals at one end of the latch plate. Two latch plates are formed at a bottom surface of the coupling plate (3b) to be spaced at a predetermined distance apart. The hinge bolt coupling groove (5a) where the hinge bolt (5) is inserted in and coupled to is formed at and through the latch plate (4a). A bolt hole, into which a coupling bolt (3e) coupled to a coupling panel (3d) of the saddle coupling portion (3) is inserted, is formed in a central portion of the coupling plate (3b). Mounting grooves (3c) in which left and right frames of the saddle coupling portion (3) are mounted are formed at both ends of the coupling plate (3b). A torsion spring mounting hole (3f) where an end of a first lug of the torsion spring is inserted into and coupled to is formed at one side of the coupling plate.

The saddle support (1) may include a cut portion (1c) formed at an upper end toward the front of the saddle, a torsion spring lug insertion portion (1d) formed at the opposite side to the cut portion (1c), a spring line connection hole (1g) which connects one side of a spring (7) coupled with the stopper to a place spaced a predetermined distance below a center of the lug insertion portion (1d), a hinge bolt through hole (1e) formed at a place spaced a predetermined distance apart from an upper end of the saddle support, and a slide groove (1a) formed at and through a place spaced a predetermined distance vertically below the hinge bolt through hole, through which the stopper (6) is slidably moved up and down. The slide groove (1a) may include a stopper intersection portion (1m) formed by tapering a middle portion of the slide groove in a shape of a narrow guide slot by a predetermined angle from an upper end and a lower end to have a narrower width, a notch (1b) extended from a tapered side of the stopper intersection portion (1m) and formed at a predetermined distance above the lower end, and a mounting hole (1h) with a predetermined length and with a wide width, formed at an upper portion such that operations for installation or removal of the stopper (6) to which the spring (7) is connected, in or from the saddle support (1) is allowed to be performed.

A cable installation hole (1p) may be formed with a predetermined length at a place spaced a predetermined distance below the slide groove (1a) of the saddle support (1) to allow the cable (6a) to be inserted therein and connected to the stopper (6). Also, the cable installation hole may include a first stage installation hole (1s) formed at an upper end thereof with a narrow width, a second stage installation hole (1u) extended below the first stage installation hole and having a width greater than that of the first stage installation hole, and a third stage installation hole (10 with a width greater than that of the second stage installation hole (1u) and extended a predetermined length below the second stage installation hole. Also, the second stage installation hole (1u) and the first stage installation hole (1s) identical to the above may be formed extended predetermined lengths below the third stage installation hole (1t). The stopper (6) may vertically reciprocate in the slide groove (1a) formed at the saddle support (1), may be inserted into and separated from the latch groove, and may be formed of a steel plate having a strength and thickness capable of supporting a rotating force caused by a load acting from the saddle. The spring (7) which is connected to the saddle support and generates a force for moving the stopper up to the latch groove may be connected to an upper end of the stopper (6). Here, one side of the cable (6a) which withdraws the stopper from the latch groove (4b) by pulling down the stopper and allows the latch (4) to rotatably move may be connected to a lower end of the stopper, and the other side of the cable may be connected to an adjusting lever which is installed at handlebars of the bicycle and separates or fixes the stopper from or to the latch groove to allow the latch (4) to pivot on the hinge bolt or stop.

The torsion spring (8) may be mounted on the hinge bolt (5), and an end of the torsion spring may be coupled to the saddle coupling portion (3) and may provide an elastic force when the tilt angle of the saddle (A) is adjusted. The torsion spring may be coupled to apply the elastic force in a direction of raising the rear side of the saddle (A) while the end of the stopper (6) is coupled to the latch groove (4b), and may allow the stopper to remain in a state of being elastically coupled to the latch groove.

The present invention provides an effect of embodying safest riding conditions by allowing a bicycle saddle surface and the upper body of a rider to form a right angle when a rear portion of a saddle is raised and a front portion thereof is lowered while the rider goes up a hill on a bicycle and allowing the bicycle saddle surface and the upper body of the rider to form the right angle when the front portion of the saddle is raised and the rear portion thereof is lowered when the rider goes down the hill.

Also, when the rider rides the bicycle for a long period of time and feels bored or a change in a riding posture is necessary, a tilt angle of the saddle is adjusted by manipulating an adjusting lever even while the bicycle is being ridden such that an effect of pleasure and convenience in riding the bicycle is obtained.

DETAILED DESCRIPTION

Hereinafter, an exemplary embodiment of the present invention will be described in detail with reference to the attached drawings. Since a configuration described and illustrated in the embodiment of the present invention and the drawings is merely one of exemplary embodiments of the present invention and does not represent the technical concept of the present invention, it should be understood that the present invention is not limited thereto and includes a variety of equivalents capable of replacing the embodiment. In descriptions of the present invention and the related art, components having the same function will be referred to as the same designations or the same symbols.

Figure 2A:
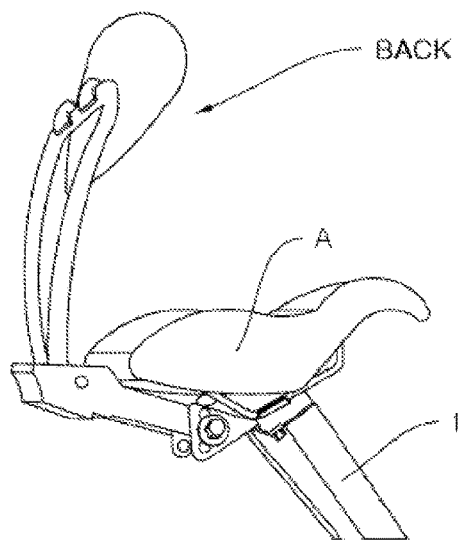
Figure 2B:
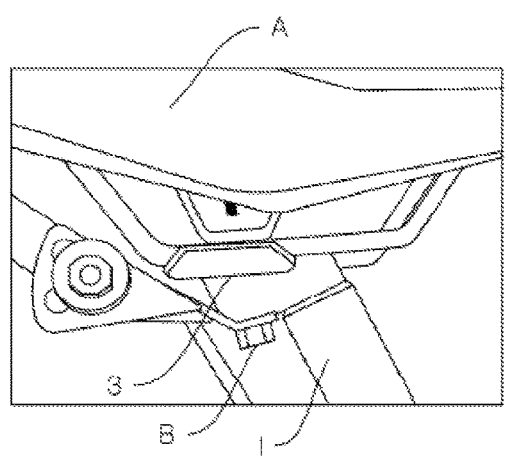
Figure 3:
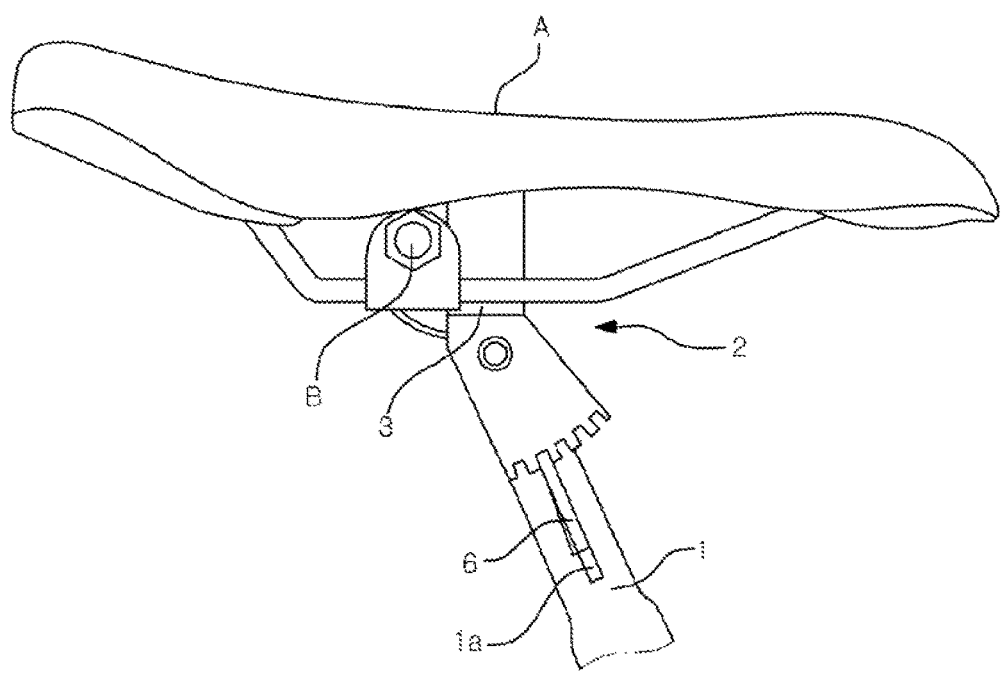
FIG. 3 is a side view illustrating an example of a tilt adjustor and a saddle installed on a saddle support according to one embodiment of the present invention.
Figure 4:
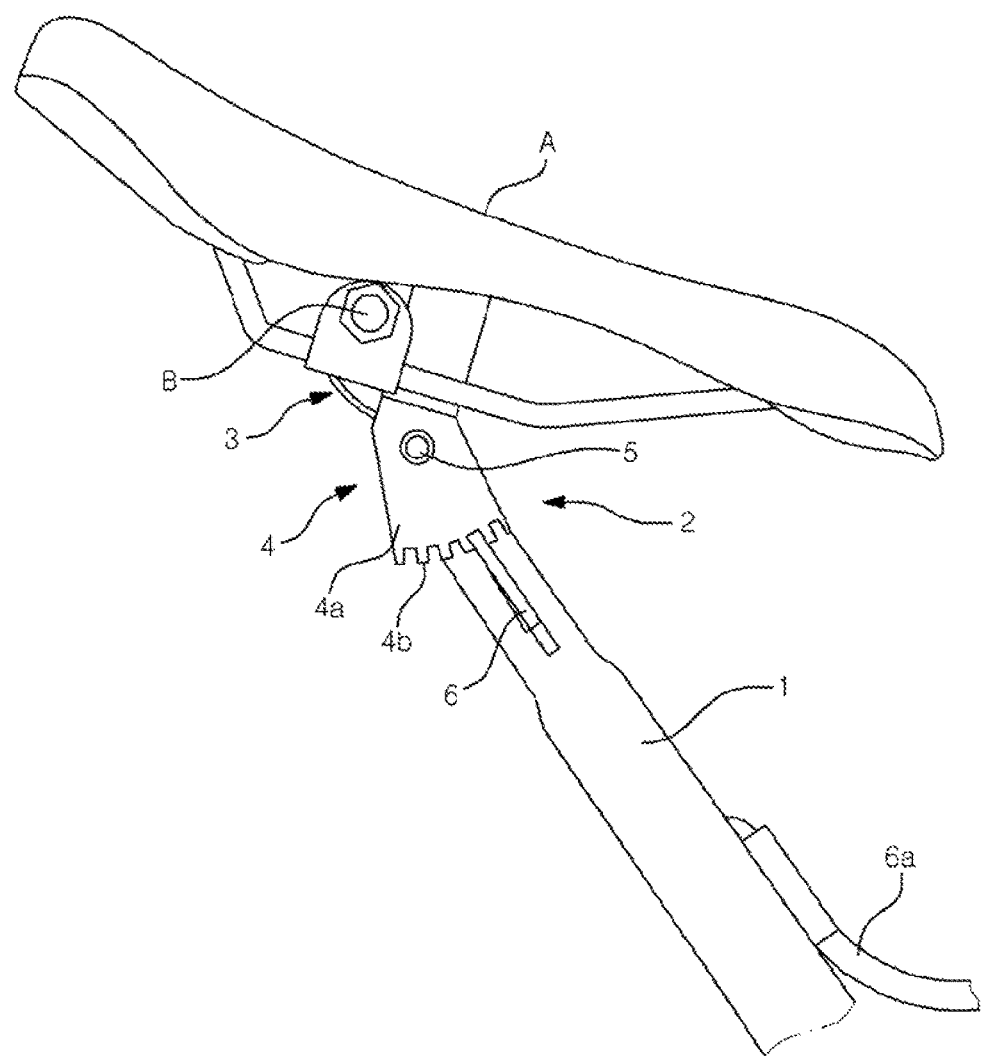
FIG. 4 is a view illustrating a state in which the saddle is tilted by the tilt adjustor of FIG. 3.

The present invention provides a tilt adjustor 2 capable of adjusting, a tilt angle of a general saddle A which is generally installed on a saddle support 1 by a fixing bolt B so that a surface on which a rider sits becomes approximately horizontal to the ground, as shown in FIGS. 2A, 2B, and 3, with respect to the saddle support 1 by raising a rear portion of the saddle on which the buttocks are positioned without releasing or tightening the fixing bolt B while a bicycle is being ridden or is in a stopped state as shown in FIG. 3, That is, the saddle A generally installed to be horizontal to the ground is adjusted to be tilted to the ground by raising or lowering the rear portion of the saddle A, on which the buttocks are located, or a front portion thereof as shown in FIG. 4 in either a case in which the bicycle is being ridden or is in a stopped state.

In more detail, as shown in FIG. 4, the tilt adjustor 2 includes a latch 4 which is coupled with a saddle coupling portion 3 to adjust the tilt angle of the saddle A at the saddle support 1 while the fixing bolt B which fixes the saddle A to the saddle support 1 is fastened and which has a plurality of latch grooves 4b at predetermined intervals, and includes a stopper 6 inserted into the latch groove 4b to fix the latch 4 by stopping rotation thereof. The saddle support 1 may employ either a quadrangular pipe or a circular pipe, and the saddle A may include a back which supports the back of the rider at a rear as shown in FIGS. 2A and 2B or may be a general saddle without a back as shown in FIG. 3.

Figure 5:
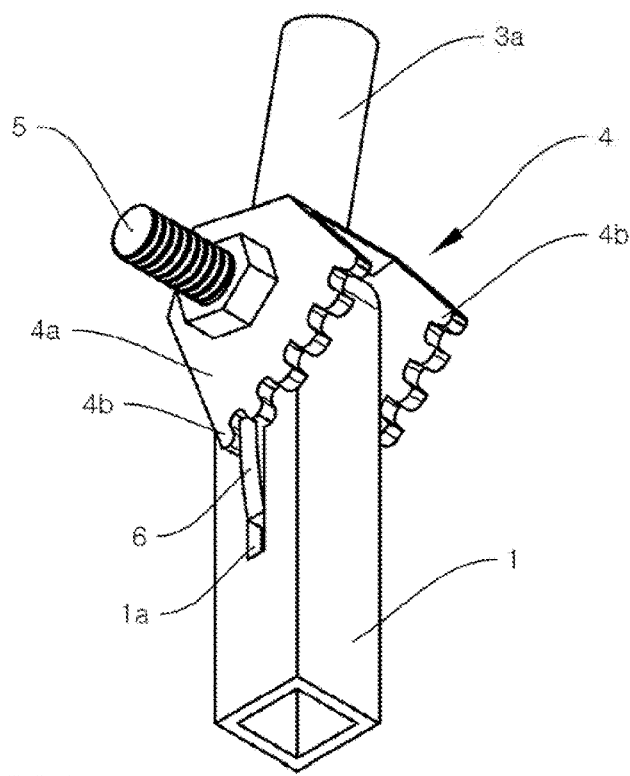
FIG. 5 is a view illustrating the tilt adjustor of FIG. 4.

As a detailed example of the latch 4, as shown in FIGS. 4 and 5, a latch plate 4a having a predetermined width, a length, and a predetermined thickness is formed in a 'Π' shape, the plurality of latch grooves 4b are formed at predetermined intervals on both sides of a vertical plate portion of the latch plate 4a of the 'Π' shape, and a coupling bar 3a coupled with the saddle coupling portion 3 is weld-coupled to a horizontal plate portion of the latch plate of the 'Π' shape.

Figure 6:
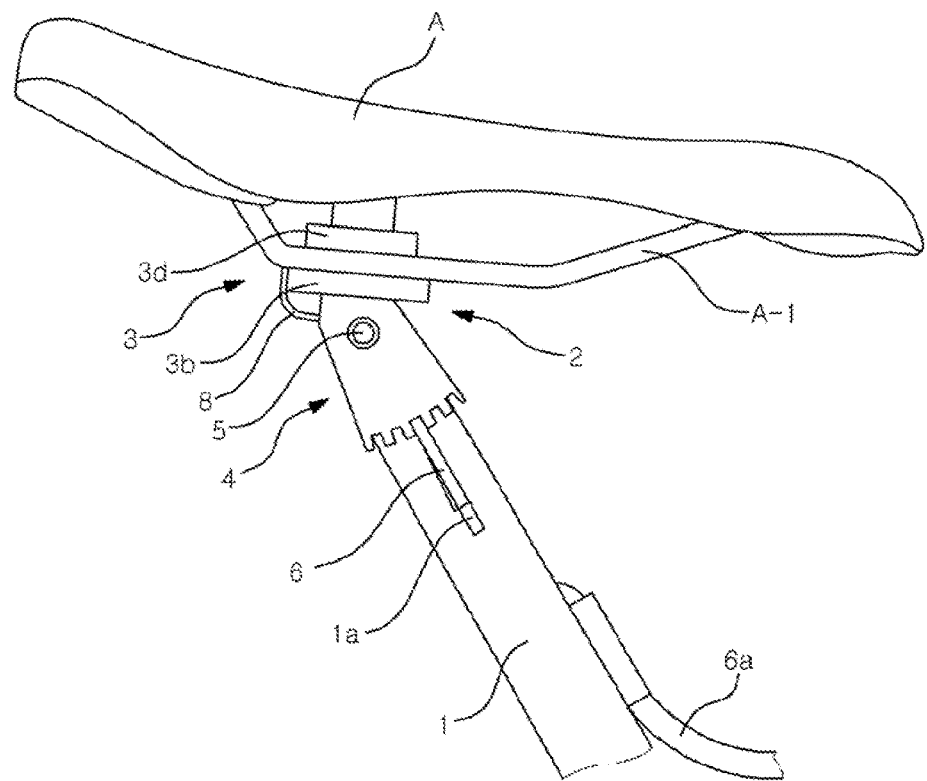
FIG. 6 is a side view illustrating an example of a tilt adjustor and a saddle installed on a saddle support according to another embodiment of the present invention.
Figure 7:
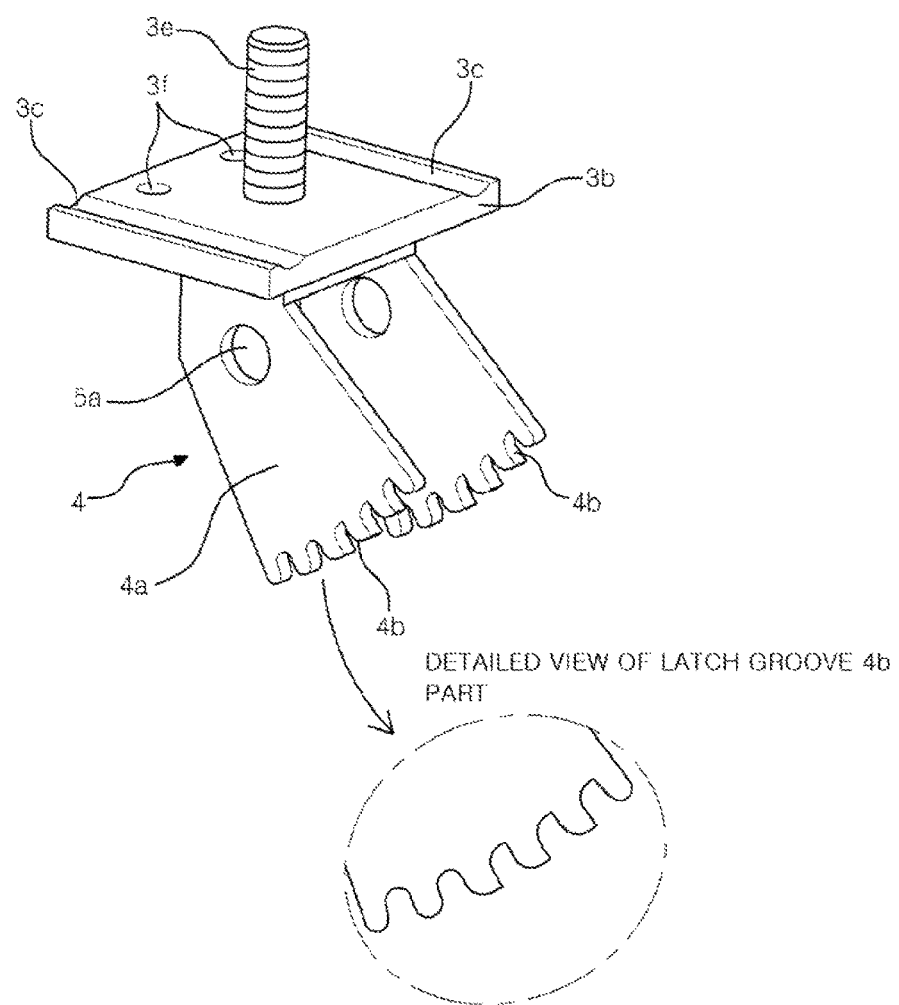
FIG. 7 is a view illustrating a latch provided at the tilt adjustor of FIG. 6.

As another example of the latch 4, as shown in FIGS. 6 and 7, the latch plate 4a having a predetermined width, a length, and a predetermined thickness is formed in the 'Π' shape and the plurality of latch grooves 4b are formed at predetermined intervals on both sides of a vertical plate portion of the latch plate 4a. Also, a coupling plate 3b coupled to the saddle coupling portion 3 is weld-coupled to a horizontal plate portion of the latch plate 4a of the 'Π' shape, and a hinge bolt coupling hole 5a where a hinge bolt 5 is inserted into and coupled to is formed at and through a vertical plate portion of the latch plate 4a.

Also, in the coupling plate 3b of the other example, as shown in FIGS. 6 and 7, mounting grooves 3c in which left and right frames A-1 of the saddle support are mounted are formed at both ends of the coupling plate 3b, and a torsion spring mounting hole 3f where a first lug end of a torsion spring is inserted and coupled is formed at one side of the coupling plate. Also, bolt holes for inserting a coupling bolt 3e are formed in central portions of the coupling plate 3b and the horizontal plate portion of the latch plate 4a such that the coupling bolt 3e is inserted into the bolt holes and coupled to a coupling panel 3d provided at the saddle coupling portion 3 in order to firmly couple the latch 4 installed at the saddle support 1 to the saddle A.

Figure 8:
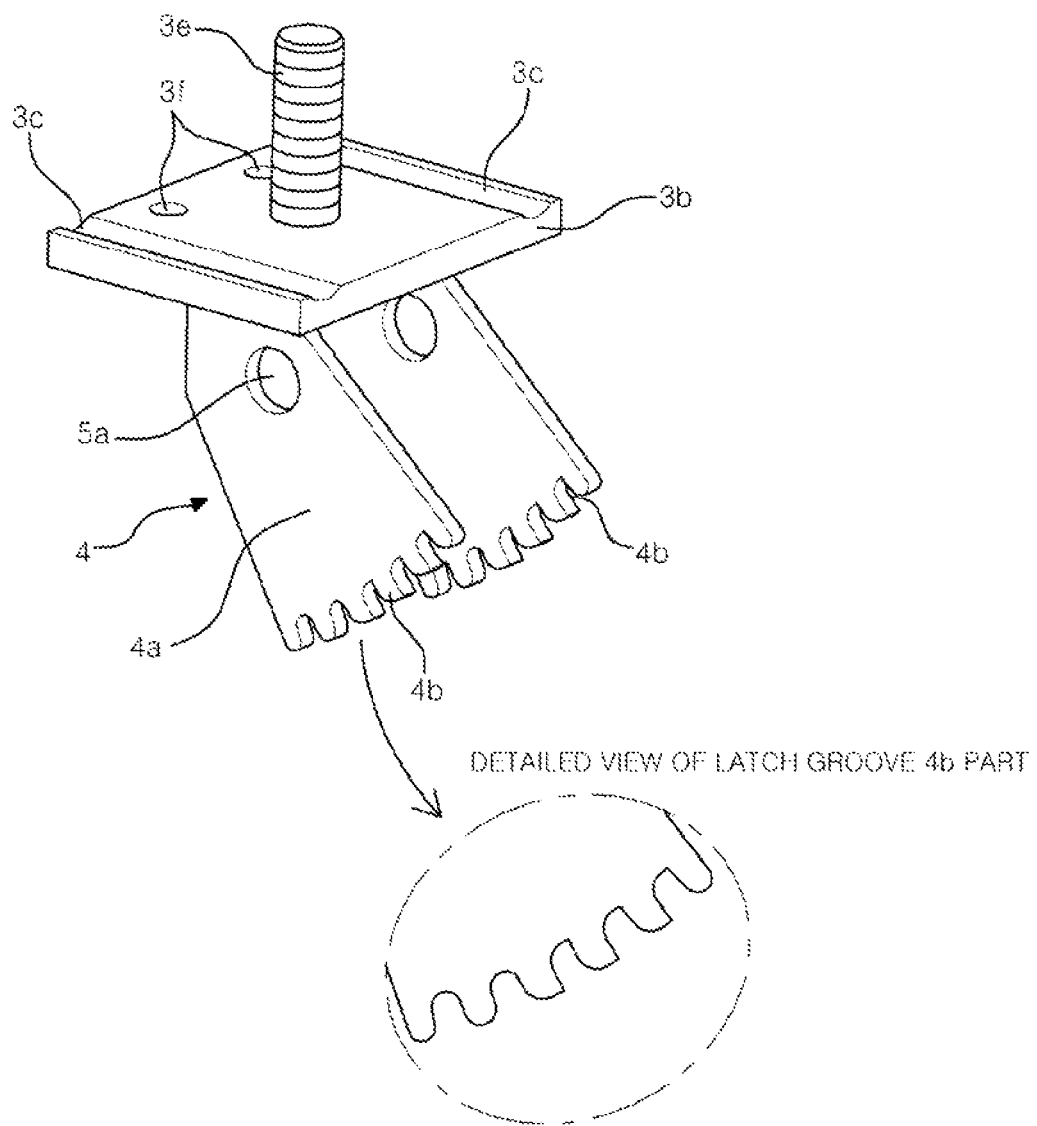
FIG. 8 is a view illustrating a latch provided at the tilt adjustor of FIG. 6.

As still another example of the latch, as shown in FIG. 8, the plurality of latch grooves 4b are formed at predetermined intervals at one end of the latch plate 4a having a predetermined width, a length, and a predetermined thickness, and two latch plates are weld-coupled to or integrated with a bottom surface of the coupling plate 3b while being spaced at a predetermined distance apart. Also, the hinge bolt coupling groove 5a where a hinge bolt 5 is inserted into and coupled with is formed at and passes through the two latch plates 4a, a bolt hole into which a coupling bolt 3e is inserted is formed in a central portion of the coupling plate 3b, mounting grooves 3c in which left and right frames A-1 of the saddle coupling portion 3 are mounted are formed at both ends of the coupling plate 3b, and a torsion spring mounting hole 3f where a lug end of the torsion spring is inserted in and coupled to is formed at one side of the coupling plate.

The latch grooves 4b, in more detail and as shown in FIGS. 7 and 8, include a plurality of grooves and teeth for insertion and separation of the stopper and stably maintaining an insertion state of the inserted stopper. The plurality of grooves and teeth in the rear side of the latch plate 4a have rounded inner and outer corners, and the plurality of grooves and teeth in the front side of the latch plate 4a respectively have one corner rounded and the other corner angulated.

In detail, five grooves and six teeth are formed. The two grooves in the rear of the latch plate 4a have rounded inner and outer corners, and the three grooves in the front of the latch plate 4a each have one corner rounded and the other corner angulated. A tooth end connected to the rounded inner corner of the groove is angularly formed and a tooth end connected to the angulated inner corner of the groove is formed round such that the tilt angle may be smoothly adjusted by pivoting the saddle and that the stopper inserted in the latch groove may not be separated and may stably remain therein when a large pivoting force is applied counterclockwise while the saddle is tilted.

Also, as shown in FIGS. 5 and 6, the latch 4 may be formed using a steel plate such that the latch 4 installed at the saddle support 1 by inserting the coupling bolt 3e into all the bolt holes and coupling to the coupling panel 3d provided at the saddle coupling portion 3 is to be strongly coupled and fixed to the saddle. Also, the coupling bolt 3e may be a generally known flat-headed bolt or hexagon-headed bolt. When the coupling bolt 3e is a flat-headed bolt, one side of the bolt hole of the coupling plate 3b is countersunk for insertion of the flat-headed bolt therein.

As shown in FIGS. 3, 4, and 6, the saddle support 1 in an angulated pipe or a circular pipe form is inserted and installed in the latch plate 4a of the latch 4, and a top of the latch 4 and the saddle support 1 are coupled using the hinge bolt 5 such that the latch 4 coupled with the saddle coupling portion 3 pivots on the hinge bolt 5 or stops to adjust the tilt angle of the saddle A.

As shown in FIGS. 4, 5, 6, 7, and 8, the latch 4 includes, at the saddle support 1, the stopper 6 which is inserted into or separated from the latch groove 4b of the latch plate 4a so as to remain in a predetermined position or to adjust the tilt angle, and a slide groove 1a through which the stopper 6 is lifted is formed at the saddle support 1.

Figure 9:
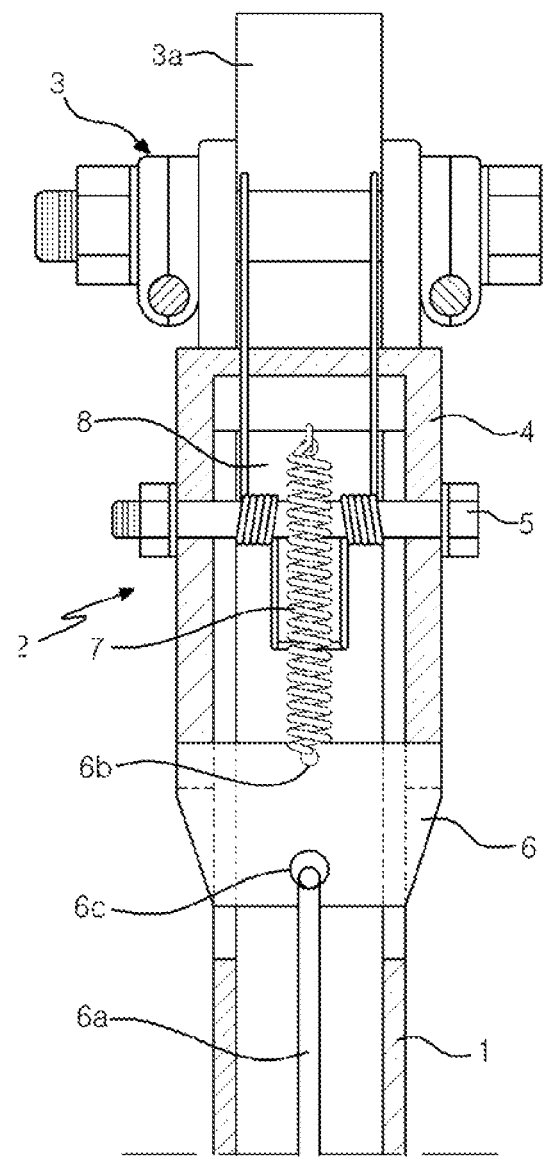
FIG. 9 is a view illustrating a coupled state of the saddle support, the tilt adjustor, and a saddle coupling portion.
Figure 10:
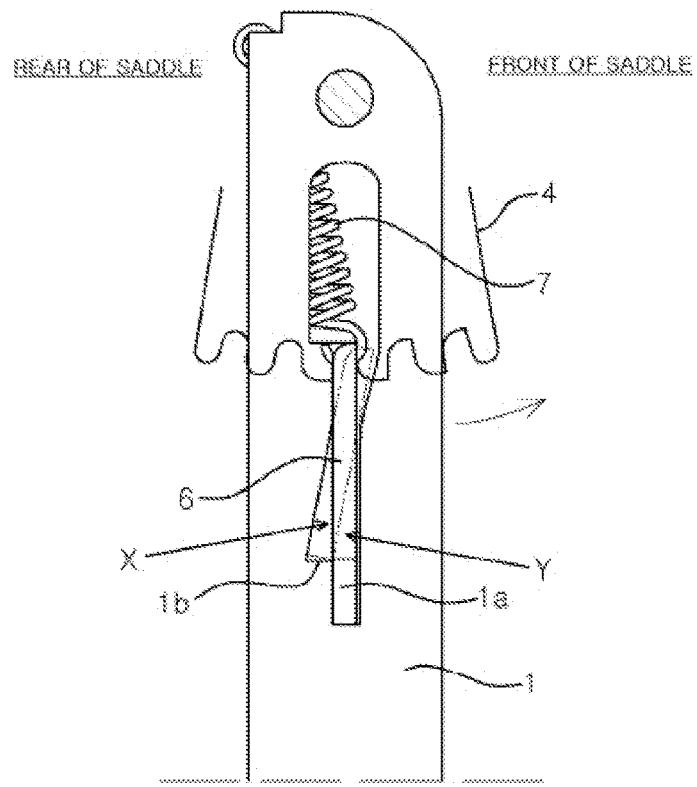
FIG. 10 is a view illustrating an operation state of the latch and a stopper in FIG. 9.

Also, as shown in FIGS. 4, 6, 9, and 10, the stopper 6, which vertically reciprocates through the slide groove 1a of the saddle support 1 and is inserted in or separated from the latch groove, is formed of a steel plate having a strength and thickness capable of supporting a pivoting force caused by a load applied from the saddle. As shown in FIG. 10, a corner which is at an end of a part inserted in the latch groove and which is closer the rear of the saddle is rounded so as to be easily inserted into and separated from the latch groove.

Also, a spring 7, which is connected to the top of the saddle support 1 and generates a force to raise the stopper 6 toward the latch groove, is connected to a top end of the stopper 6. One side of a cable 6a, which withdraws the stopper from the latch groove 4b to allow the latch 4 to rotatably move, is connected to a bottom end of the stopper, and the other side of the cable is connected to an adjusting lever, which is installed at handlebars of the bicycle and allows the stopper to be removed from the latch groove or be fixed therein such that the latch 4 pivots on the hinge bolt 5 or stops.

In more detail, both sides of the upper end of the stopper 6, wherein the corner at the end thereof which is closer to the rear of the saddle is rounded so as to be easily inserted and separated and the corner at the end thereof which is closer to the front of the saddle is rectangular, protrude outward from the saddle support 1 and are coupled to the latch groove 4b. A cable coupling hole 6c for connecting the cable 6a which withdraws the stopper 6 from the latch groove 4b is formed at a center of a lower end of the stopper. A spring line coupling hole 6b for connecting the spring 7 coupled to the saddle support 1 to raise the stopper 6 is formed at a center of a upper end of the stopper.

The cable 6a connected to the stopper 6 may be a cable widely used for braking a bicycle and formed by inserting a steel line 6a' in a sheath in which the steel line is movable forward and backward by adjustment of a lever.

The cable 6a connected to the stopper 6 at its opposing end is connected to a saddle tilt angle adjusting lever (not shown) having a shape identical or similar to that of a brake lever generally installed at handlebars of a bicycle. As shown in FIG. 10, when the adjusting lever is pulled, the steel line of the cable is pulled and the stopper 6 is pulled downward such that both sides of the stopper are withdrawn from the latch groove 4b. When the adjusting lever is released, the steel line of the cable is pushed and the stopper 6 is moved upward by an elastic force of the spring 7 connected to the stopper 6 such that the both sides of the stopper are inserted into the latch groove 4b and remain in an inserted state.

The saddle support 1 according to one embodiment of the present invention will be described in detail. As shown in FIG. 6, to install the saddle A and a configuration for adjusting the tilt angle of the saddle, the saddle support 1 includes a cut portion 1c formed by cutting a certain portion of a top end toward the front of the saddle to be gradually sloped as shown in FIG. 11A, so as to avoid contacting with the coupling plate 3b of the saddle coupling portion 3, which pivots with the saddle A, when a front portion of the saddle is lowered or raised by pivoting the saddle A with respect of the hinge bolt 5.

Figures 11A, 11B, 11C, 11D:
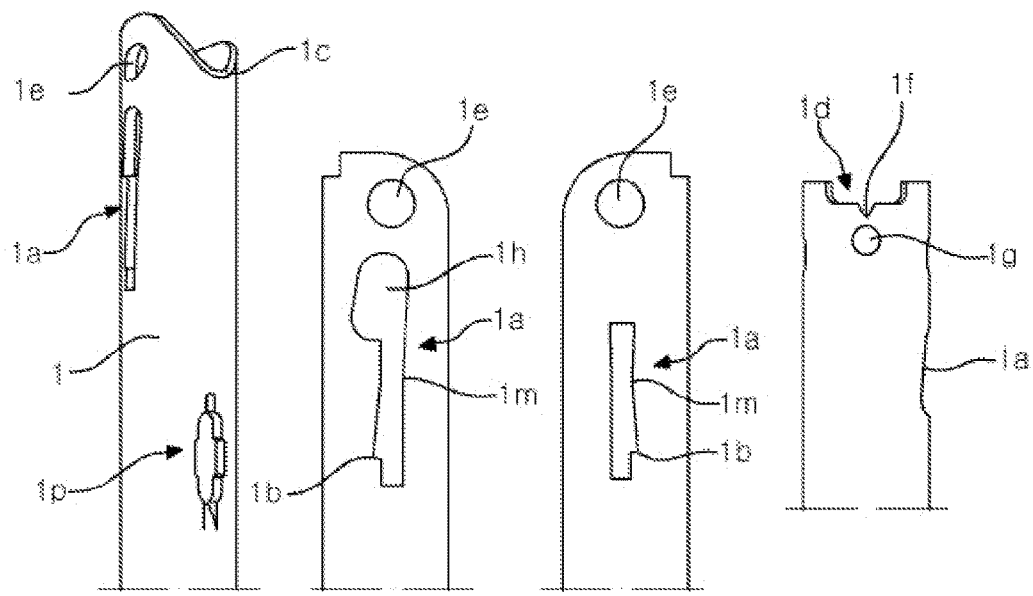
FIGS. 11A to 11D are views illustrating a top of the saddle support of FIG. 6.

Also, a torsion spring lug insertion portion 1d is formed by cutting out an end of the saddle support 1 at the opposite side of the cut portion 1c with predetermined depth and a predetermined width as shown in FIGS. 11B to 11D, so as to avoid contacting of both lugs of the torsion spring 8 installed to surround the saddle coupling plate 3b and the coupling panel 3d and pivoting with the saddle A when the rear portion thereof is lowered or raised by pivoting the saddle A.

Also, at a center of the torsion spring lug insertion portion 1d, a spring line fixing groove if in which a spring line of the spring 7 connected to the saddle support 1 shown in FIG. 9 is held so as not to move leftward and rightward is formed with a predetermined depth, and a spring line connection hole 1g which holds and connects one end of the spring 7 is formed.

Also, as shown in FIGS. 11A to 11C, a hinge bolt through hole 1e into which the hinge bolt 5 is inserted is formed at a place spaced a predetermined distance apart from the top end of the saddle support, and such that a bottom end of the hinge bolt through hole 1e is formed at a position which coincides with a bottom end of the cut portion 1c.

Also, as shown in FIGS. 9, 10, and 11A to 11D, the slide groove 1a is formed at a place spaced a predetermined distance vertically below the hinge bolt through hole 1e so as to have a narrow guide slot shape with a length capable of allowing the stopper 6 to slidably move up and down to be inserted into or separated from the latch groove 4b.

The slide groove 1a, as shown in FIGS. 11B and 11C, includes a stopper intersection portion 1m which is formed by tapering, from a top end and a bottom end, a middle portion of the slide groove having a narrow guide slot shape to have a narrower width, and includes a notch 1b formed at a predetermined distance above the bottom end and extended to an inclined side of the stopper intersection portion 1m.

Accordingly, as shown in FIG. 10, when a load is applied to the rear portion of the saddle, a rotating force acts counterclockwise on the latch 4 and the stopper 6 is tilted to a position X such that the stopper 6 is supported by the notch 1b when a load of the rider acts on the saddle during riding of the bicycle.

That is, the load of the rider is generally applied to the rear side of the saddle during riding of the bicycle. When the load is transferred counterclockwise to the stopper 6 through the latch 4, the stopper 6 is moved downward in the slide groove 1a while being tilted toward the notch 1b. Eventually, both bottom ends of the stopper are held by the notch 1b such that the stopper 6 is supported by the saddle support 1. Through this, the load of the rider while riding the bicycle, which is transferred from the saddle, is doubly supported by the hinge bolt 5 and the stopper 6, and a separation of the stopper caused by a pressure applied to the rear side of the saddle is prevented such that the saddle is stably and firmly fixed.

Meanwhile, when the rider moves his or her hips to move the load applied to the rear of the saddle toward the front side of the saddle in order to adjust the tilt angle of the saddle during riding of the bicycle, as shown in FIGS. 11A to 11D, the stopper 6 moves to a position Y due to a rotating force of the latch 4 rotating clockwise such that the stopper 6 is separated from the notch 1b which supports the load of the rider of the bicycle. Here, when the stopper 6 is pulled down by pulling the adjusting lever, the stopper 6 is separated from the latch groove 4b. In this state of pulling the adjusting lever, when the angle of the saddle is adjusted by applying the load to the rear of the saddle and then the adjusting lever returns to an original position, the stopper 6 moves back to the position X such that the load of the rider is doubly supported by the hinge bolt 5 and the stopper 6 connected to the latch 4. Accordingly, the saddle is safely and firmly fixed such that the bottom end of the stopper 6 is supported by the notch groove 1b even when the saddle is suddenly moved down due to a deformation of or damage to the coupling portion of the hinge bolt 5 during riding of the bicycle. Accordingly, since an instantaneous downward movement of the saddle A does not occur, riding safety may be provided.

Also, as shown in FIG. 11B, a wide mounting hole 1h with a predetermined length is formed at a top of one side of the slide groove 1a formed to pass through the saddle support. Through this, the stopper 6 to which the spring 7 is connected may be installed in or removed from the saddle support 1.

Also, when a cross section of the slide groove 1a formed while passing through the saddle support 1 is divided by a horizontal axis and a vertical axis and centers of the slide grooves formed at opposing sides of the saddle support are connected to form the horizontal axis, a cable installation hole 1p with a predetermined length is formed at a place spaced a predetermined distance vertically below the vertical axis to allow the cable 6a to be inserted therein and connected to the stopper 6 as shown in FIG. 11A.

Figures 12A, 12B, 12C:
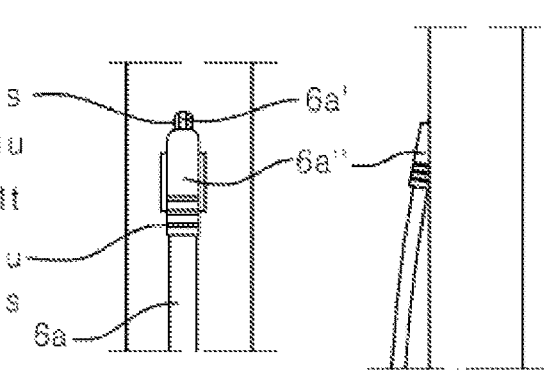
FIGS. 12A to 12C are views illustrating an installation state of a cable installation hole and a cable end of FIG. 11.

The cable installation hole 1p, as shown in FIG. 12A, includes a first stage installation hole 1s with a narrow width and formed at a top, a second stage installation hole 1u with a width greater than that of the first stage installation hole and extended below the first stage installation hole, and a third stage installation hole 1t with a predetermined length and a width greater than that of the second stage installation hole 1u and extended below the second stage installation hole. Also, the second stage installation hole 1u and the first stage installation hole 1s identical to the above are extended by predetermined lengths below the third stage installation hole 1t.

As shown in FIG. 12B, the first stage installation hole 1s is a space in which the steel line 6a', which is a main material of the cable 6a, moves according to a pulling and pushing operation of the adjusting lever, the second stage installation hole 1u is a space in which both ends of an end member 6a" of the cable are forcibly inserted and fixed, and the third stage installation hole 1t is a space through which the end member 6a" of the cable passes and which allows operation of connecting the cable 6a with the stopper 6. That is, as shown in FIGS. 12B and 12C, an end of the cable is fixed to and installed in the cable installation hole 1p.

Also, as shown in FIGS. 6 and 9, in order to allow the saddle A to elastically pivot on the hinge bolt 5 which pivotably couples the saddle support 1 with the latch 4 to adjust the tilt angle thereof, the torsion spring 8 is mounted on the hinge bolt 5 and an end of the torsion spring is coupled to the saddle coupling portion 3 to apply an elastic force in a raising direction of the rear side of the saddle A while the end of the stopper 6 is coupled to the latch groove 4b. The hinge bolt 5 may employ a bolt as shown in FIG. 3 or may employ a cylindrical hinge pin with a predetermined diameter and C-shaped retaining rings fitted on both ends of the hinge pin to pivotably couple the saddle support 1 with the latch 4.

The above detailed description of the saddle support 1 according to one embodiment of the present invention is identically applicable to the top of the saddle support, which has a shape in which a quadrangular pipe is connected to the top of the saddle support 1 shown in FIGS. 3 and 4.

Figure 13:
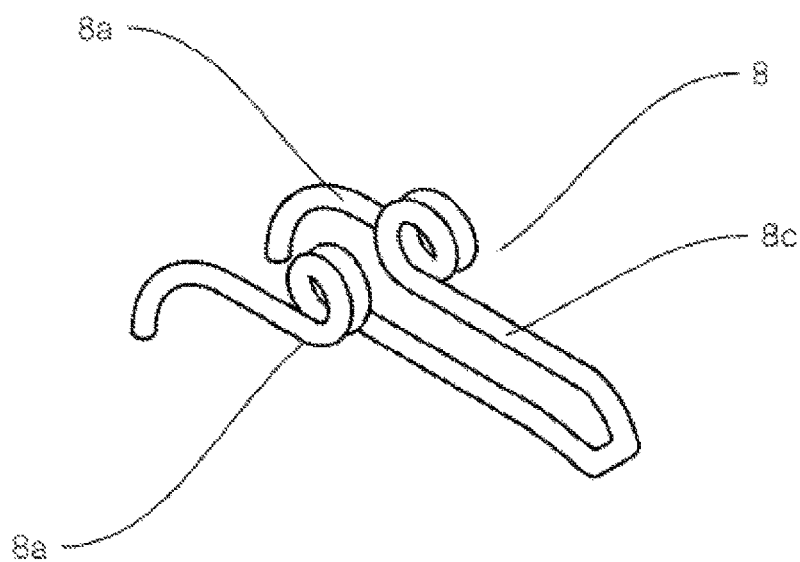
FIG. 13 is a view illustrating a torsion spring.

In the case of the torsion spring 8, a winding portion 8a which is coupled to the hinge bolt 5 and generates a main elastic force as shown in FIG. 13, a first lug 8b coupled to the saddle coupling portion 3 shown in FIGS. 6 and 9, and a second lug 8c inserted and positioned in the saddle support 1 may be formed by winding a single linear element with excellent elasticity.

Figure 1:
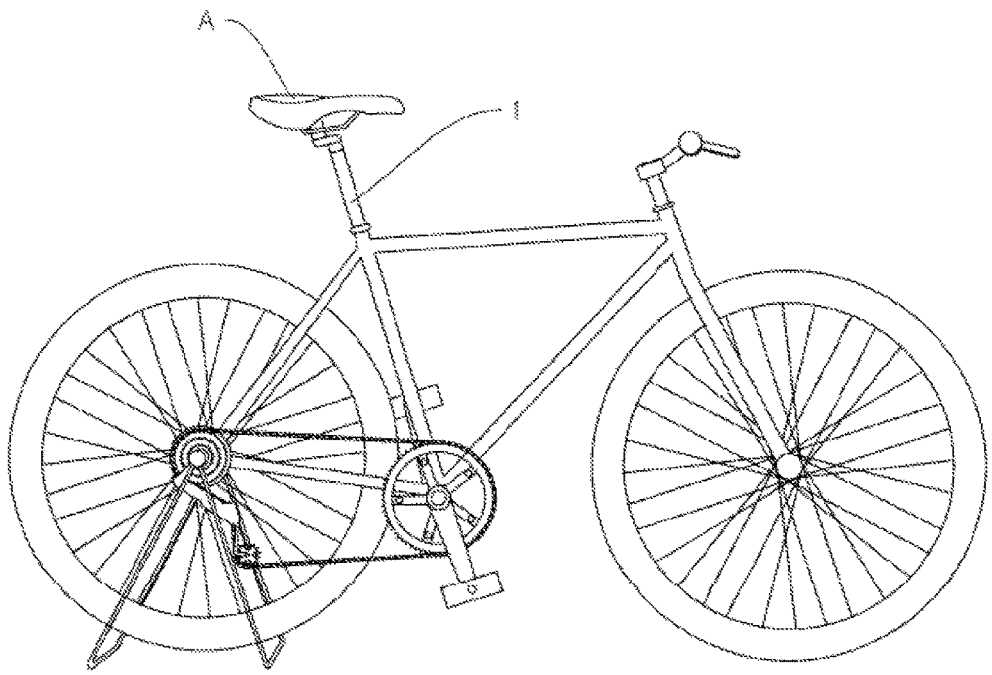
FIGS. 1, 2A, and 2B are views illustrating a state in which a bicycle saddle is installed according to a conventional technology.

Through the above configuration, when the rider rides up a hill on the bicycle, since the rear portion of the saddle A installed on the saddle support 1 is raised and the front portion thereof is lowered during riding of the bicycle to adjust a saddle surface of the bicycle to be at a right angle with an upper body of the rider, riding conditions the same as that of bicycle-riding conditions shown in FIG. 1 may be provided. Also, when the front portion of the saddle is raised and the rear portion thereof lowered while the rider goes down a hill, likewise, the same riding conditions as that of the bicycle-riding conditions shown in FIG. 1 such that optimal riding conditions may be provided.

Also, when riding a bicycle for a long period of time, people generally feel bored. However, adjusting front and rear tilt angles of the saddle A installed on the saddle support 1 by manipulating the adjusting lever is more simple than manipulating a gear shift while riding the bicycle without stopping, and pleasant and comfortable riding of the bicycle may be provided to the rider.

Although the exemplary embodiment of the present invention has been described above with reference to the drawings, the tilt adjustor 2 corresponding to a core technology of the present invention may in particular be applied to the saddle support 1 even when not separately shown or described in relation to a saddle installation structure. Also, it should be understood that embodiments made by simply combining the above embodiment with an existing well-known technology and a technology usable by one of ordinary skill in the art through deformations made from the claims and the detailed description of the present invention will be naturally included in the technical scope of the present invention.

The invention claimed is:

1. An apparatus for adjusting a tilt angle of a bicycle saddle in a bicycle in which a saddle is installed on a saddle support, the apparatus comprising:
   a tilt adjustor capable of adjusting a tilt angle of the saddle with respect to the saddle support by raising or lowering a rear portion or a front portion of the saddle during riding of the bicycle or in a state in which riding is stopped,
   wherein the tilt adjustor includes a latch which connects the saddle support with a saddle coupling portion and a stopper which stops and fixes rotation of the latch at the saddle support,
   wherein the latch comprises:
      a latch plate with a predetermined width, a length, and a predetermined thickness and having a horizontal plate portion and vertical plate portions connected to the horizontal plate portion; and
      a plurality of latch grooves formed at predetermined intervals on free ends of the vertical plate portions of the latch plate,
   wherein the latch grooves are formed of a plurality of grooves and teeth to stably maintain an insertion and separation operations of the stopper and maintain an insertion state of the inserted stopper, wherein the plurality of grooves and teeth in the rear side of the latch plate have rounded inner and outer corners, wherein the plurality of grooves in the front side of the latch plate respectively have a rounded corner on one side in the inside of a groove and an angulated corner on the other side in the inside of the groove, ends of the teeth connected to the rounded corners inside the grooves are angularly formed, and ends of the teeth connected to the angulated corners inside the grooves are formed to be round.

2. The apparatus of claim 1, wherein the horizontal plate portion of the latch plate is weld-coupled to a coupling bar coupled to the saddle coupling portion, and wherein an upper portion of the latch plate is fixed to the saddle support by inserting a hinge bolt thereinto.

3. An apparatus for adjusting a tilt angle of a bicycle saddle in a bicycle in which a saddle is installed on a saddle support, the apparatus comprising:
- a tilt adjustor capable of adjusting a tilt angle of the saddle with respect to the saddle support by raising or lowering a rear portion or a front portion of the saddle during riding of the bicycle or in a state in which riding is stopped,
- wherein the tilt adjustor includes a latch which connects the saddle support with a saddle coupling portion and a stopper which stops and fixes rotation of the latch at the saddle support,
- wherein the saddle support comprises a cut portion formed at an upper end toward the front of the saddle, a torsion spring lug insertion portion formed opposite to the cut portion, a spring line connection hole which connects one side of a spring coupled with the stopper to a place spaced at a predetermined distance below a center of the lug insertion portion, a hinge bolt through hole formed at a place spaced at a predetermined distance apart from the upper end of the saddle support, and a slide groove formed at and through a place spaced at a predetermined distance vertically below the hinge bolt through hole, through which the stopper is slidably moved up and down.

4. The apparatus of claim 3, wherein the slide groove comprises a stopper intersection portion formed by tapering a middle portion of the slide groove in a shape of a narrow guide slot by a predetermined angle from an upper end and a lower end to have a narrower width, a notch formed at a predetermined distance above the lower end and extended from a tapered side of the stopper intersection portion, and a mounting hole with a predetermined length and a wide width through which installation or removal of the stopper, where a spring is connected to an upper portion thereof, in or from the saddle support, is performed.

5. The apparatus of claim 4, wherein a cable installation hole is formed with a predetermined length at a place spaced at a predetermined distance below the slide groove of the saddle support to allow the cable to be inserted therein and connected to the stopper,
- wherein the cable installation hole comprises a first stage installation hole formed at the top thereof with a narrow width, a second stage installation hole extended below the first stage installation hole and having a width greater than that of the first stage installation hole, and a third stage installation hole with a width greater than that of the second stage installation hole and extended a predetermined length below the second stage installation hole, and
- wherein the second stage installation hole and the first stage installation hole identical to the above are extended predetermined lengths below the third stage installation hole.

6. The apparatus of claim 5, wherein the stopper vertically reciprocates in the slide groove formed at the saddle support, is inserted into and separated from the latch groove, and is formed of a steel plate having strength and a thickness capable of supporting a rotating force caused by a load acting from the saddle, and the spring which is connected to a spring line coupling hole of the saddle support and generates a force for moving the stopper up to the latch groove is connected to an upper end of the stopper,
- wherein one side of the cable which withdraws the stopper from the latch groove by pulling down the stopper and allows the latch to rotatably move is connected to a bottom end of the stopper, and
- wherein the other side of the cable is connected to an adjusting lever which is installed at handlebars of the bicycle and separates or fixes the stopper from or to the latch groove to allow the latch to pivot on the hinge bolt or stop.

7. The apparatus of claim 6, wherein the torsion spring is mounted on the hinge bolt, an end of the torsion spring is coupled to the saddle coupling portion and provides an elastic force when the tilt angle of the saddle is adjusted, and
- wherein the torsion spring is coupled to apply the elastic force in a raising direction of the rear side of the saddle while the end of the stopper is coupled to the latch groove, and allows the stopper to remain in a state of being elastically coupled to the latch groove.

* * * * *